United States Patent [19]

Kainmüller et al.

[11] 4,228,281
[45] Oct. 14, 1980

[54] DICARBOXYLIC ACIDS CONTAINING TRIAZINE RINGS

[75] Inventors: Thomas Kainmüller, Lindenfels, Fed. Rep. of Germany; Jürgen Habermeier, Pfeffingen, Switzerland; Lothar Buxbaum, Lindenfels, Fed. Rep. of Germany

[73] Assignee: Ciba-Geigy Corporation, Ardsley, N.Y.

[21] Appl. No.: 943,031

[22] Filed: Sep. 18, 1978

[30] Foreign Application Priority Data

Sep. 23, 1977 [CH] Switzerland .................. 11651/77

[51] Int. Cl.$^2$ ............................................ C07D 403/12
[52] U.S. Cl. ....................................... 544/198; 544/113; 544/96; 544/54; 544/58.6
[58] Field of Search ........................................ 544/96, 544/112, 58, 197, 198, 113, 54, 58.6; 542/431, 436, 450, 461, 470

[56] References Cited

U.S. PATENT DOCUMENTS

| | | | |
|---|---|---|---|
| 2,473,475 | 6/1949 | Keller et al. | 542/461 |
| 3,177,207 | 4/1965 | Siegel et al. | 542/461 |
| 3,697,520 | 10/1972 | Winter | 260/249.6 |
| 3,734,909 | 5/1973 | Varsanyi et al. | 544/198 |
| 3,867,400 | 2/1975 | Habermeier | 260 309.5 |
| 3,954,790 | 5/1976 | Habermeier | 260/309.2 |
| 3,956,754 | 12/1974 | Habermeier | 260/75 |
| 4,002,600 | 1/1977 | Habermeier | 260/75 |
| 4,034,018 | 7/1977 | Habermeier | 260/860 |
| 4,034,019 | 7/1977 | Habermeier | 260/860 |

FOREIGN PATENT DOCUMENTS

| | | | |
|---|---|---|---|
| 529326 | 8/1956 | Canada | 542/461 |
| 1100583 | 3/1961 | Fed. Rep. of Germany | 542/461 |
| 40-11072 | 3/1965 | Japan | 542/461 |

OTHER PUBLICATIONS

Temkina, et al., Chemical Abstracts, vol. 69, entry 27392 (1968).
J. T. Thurston et al., J. Amer. Chem. Soc., vol. 73, p. 2981 (1951).
Chemical Abstracts, vol. 73, entry 57285h (1970).

*Primary Examiner*—John M. Ford
*Attorney, Agent, or Firm*—Luther A. R. Hall

[57] ABSTRACT

Dicarboxylic acids containing at least two triazine rings are very suitable for producing thermoplastic polyesters having high glass transition temperatures and high dimensional stability under heat, and at the same time good processing characteristics.

15 Claims, No Drawings

DICARBOXYLIC ACIDS CONTAINING TRIAZINE RINGS

The present invention relates to dicarboxylic acids containing triazine rings, to acid halides and acid esters thereof, and also to linear thermoplastic polyesters containing radicals of these dicarboxylic acids.

The use of s-triazinedicarboxylic acids or esters thereof for producing polymers, such as polyesters, polyamides, polybenzimidazoles or polybenzoxazoles, has already been suggested in the German Offenlegungsschrift No. 2,121,184. Compared with, for example, the polyalkyleneterephthalates mostly used, the polyesters from the said acids and alkanediols have a higher glass transition temperature. A disadvantage is however that the polyesters can be processed only at high temperatures. To avoid this disadvantage, it is suggested in the German Offenlegungsschriften Nos. 2,533,715 and 2,533,675 that homopolyesters with N-heterocyclic diols, or copolyesters with terephthalic or isophthalic acid, be used since these give a favourable ratio of glass transition temperature to processibility (a characteristic value for processibility is the melting or softening temperature).

It is the object of the present invention to provide dicarboxylic acids containing s-triazine rings, with which dicarboxylic acids it is possible to obtain, in both homo- and copolyesters, high glass transition temperatures, and at the same time an improvement of the processing characteristics. The polyesters have good mechanical properties, especially good toughness properties.

The subject matter of the present invention comprises dicarboxylic acids which contain triazine rings and which are of the general formula I

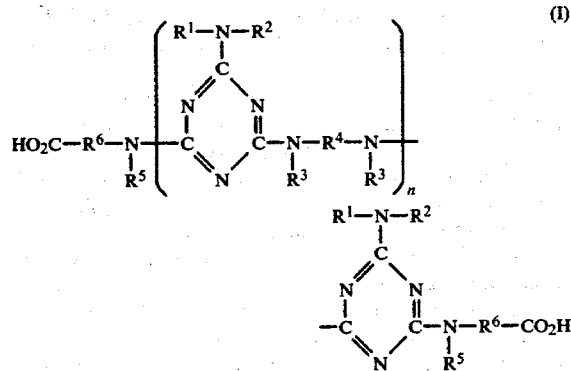

in which n has a value from 1 to 100, $R^1$, $R^2$, $R^3$ and $R^5$ independently of one another are each a hydrogen atom, or an acyclic or cyclic hydrocarbon radical which is of aliphatic or aromatic character and which has 1 to 22 C atoms, or $R^1$ and $R^2$ together are alkylene which has 3 to 7 C atoms and which can be interrupted by O or S atoms, $R^4$ is a bivalent acyclic or cyclic hydrocarbon radical which is of aliphatic or aromatic character and which has 2 to 18 C atoms, or $R^4$ together with one $R^3$ and the N atom to which they are bound form a ring having 4 to 7 C atoms, or $R^4$, and also both $R^3$ s together, are alkylene groups having 1 to 5 C atoms, and forming together with the two N atoms a 5- to 7-membered ring, and $R^6$ is a bivalent acyclic or cyclic hydrocarbon radical which is of aliphatic or aromatic character and which has 1 to 12 C atoms, and also acid esters and acid halides thereof.

The dicarboxylic acid of the formula I as ester (mono- or diester) preferably contains alkoxy or hydroxyalkoxy groups having 1 to 12 C atoms, especially 1 to 6 C atoms, cycloalkyloxy or hydroxycycloalkyloxy having 5 or 6 ring carbon atoms, or aryloxy groups having 6 to 10 C atoms, particularly the phenoxy group. The acid dichlorides are preferred of the acid halides.

The value of n is preferably 1 to 50, and especially 1 to 10. n can be an integer or a fractional number; in the latter case, there exists a mixture of dicarboxylic acids containing oligomeric triazine rings, which mixture is also within the scope of the present invention. It is advantageous in some cases if n has at least a value of 2.

As a hydrocarbon radical of aromatic character, $R^4$ can be substituted by $C_1$-$C_6$ alkyl or by halogen, especially chlorine. $R^3$ and $R^5$ are preferably H atoms. The hydrocarbon radicals of aromatic character denoted by $R^1$ to $R^6$ are preferably benzene derivatives. $R^1$, $R^2$, $R^3$ and $R^5$ as a hydrocarbon radical preferably contain 1 to 12 C atoms, and $R^1$ and $R^2$ as alkylene, oxaalkylene or thioalkylene together contain 4 to 7 C atoms. As a hydrocarbon radical, $R^4$ preferably contains 2 to 15 C atoms, and $R^6$ 1 to 7 C atoms.

$R^1$, $R^2$, $R^3$ and $R^5$ can be straight-chain or branched-chain alkyl, unsubstituted or alkyl-substituted cycloalkyl, cycloalkylalkylene, aryl or aralkyl. The alkyl substituent preferably contains 1 to 4 C atoms. $R^1$ and $R^2$ together can also be alkylene which can be interrupted by O or S atoms, for example 1,4-butylene, 1,5-pentylene, 3-oxapentylene or 3-thiapentylene. Further examples are: methyl, ethyl, i-propyl, n-propyl, butyl, pentyl, hexyl, heptyl, octyl, i-octyl, decyl, dodecyl, hexadecyl, octadecyl, eicosyl, cyclopentyl, cyclohexyl, cycloheptyl, methylcyclohexyl, cyclohexylmethyl, naphthyl, phenyl, methylphenyl, benzyl or methylbenzyl. $R^1$ and $R^2$ are preferably methyl, ethyl, phenyl or benzyl $R^4$ can be straight-chain or branched-chain alkylene having 2 to 12 C atoms, preferably 2 to 6 C atoms. Examples are methylene, ethylene, octadecylethylene, 1,2- or 1,3-propylene, 1,2-, 1,3- or 1,4-butylene, pentylene, hexylene, 1,2- or 1,8-octylene, dodecylene or octadecylene.

$R^4$ can also be unsubstituted or alkyl-substituted cycloalkylene, cycloalkylenealkylene, cycloalkylbisalkylene, arylene, arylenealkylene or arylbisalkylene. The cycloalkyl groups preferably contain 5, particularly 6, ring carbon atoms, and the alkyl substituent preferably 1 to 4 C atoms. The alkylene groups preferably contain 1 to 4 C atoms, especially 1 or 2 C atoms. Examples are: 1,2- or 1,3-cyclopentylene, 1,2-, 1,3- or 1,4-cyclohexylene, methylcyclopentylene, 3-methyl-p-cyclohexylene, cycloheptylene, p-methylenecyclohexyl, 1,4-cyclohexylbismethylene, 3,3,5-trimethyl-1-cyclohexylene-3-methylene, naphthylene, o-, m- or p-phenylene, p-benzylene, xylylene, 2-methyl-p-phenylene or methyl-p-benzylene.

$R^4$ can also be a bivalent radical of the formula

—aryl-X-aryl in which aryl is preferably phenyl, and X is a direct bond, O, S, SO₂, alkylene having 1 to 3 C atoms, alkylidene having 2 to 12 C atoms, particularly 2 to 6 C atoms, or cycloalkylidene having 5 or 6 ring carbon atoms. The free bonds of the two aryl groups are preferably in the p-position. Examples of X are: methylene, ethylene, 1,2- or 1,3-propylene, ethylidene, 1,1- or 2,2-propylidene, 1,1- or 2,2-butylidene, pentylidene, hexylidene, cyclopentylidene, cyclohexylidene, benzylidene, bisphenylmethylidene or 1,1,1-trichloroethylidene. Preferred among these groups is p-bisphenylene or p-methylenebisphenylene.

$R^4$ together with one $R^3$ and the N atom to which they are bound can form a ring having 4 to 7 C atoms; or $R^4$, and also both $R^3$ s together, are each alkylene having 1 to 5 C atoms, and forming together with the two N atoms a 5- to 7-membered ring. Examples are: 1,4-piperazinylene, 1,3-imidazolidinylene, 1,3-piperazinylene, 1,2-pyrazolidinylene or a radical of the formula

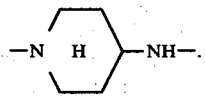

$R^6$ can be straight-chain or branched-chain alkylene or alkylidene preferably having 1 to 6 C atoms, cycloalkylene, arylene or arylenealkylene. The alkylene group preferably contains 1 to 4 C atoms, especially 1 or 2 C atoms, and is preferably bound to the N atom. Examples are: methylene, ethylene, ethylidene, 1,2- or 1,3-propylene, butylene, pentylene, hexylene, dodecylene, o- and particularly m- or p-phenylene, p-benzylene or p-cyclohexylene.

The dicarboxylic acids of the formula I are obtained, by processes known per se, by reacting aminodichlorotriazine of the formula II

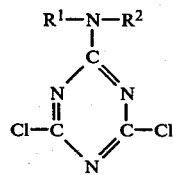

with a diamine of the formula III

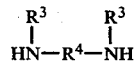

and an aminocarboxylic acid, or an ester derivative thereof, of the formula IV

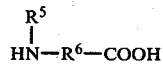

with removal of the formed hydrogen chloride, wherein $R^1$ to $R^6$ have the meanings defined in the foregoing, and the dicarboxylic acid dihalides are obtained by reacting the dicarboxylic acid of the formula I with a halogenating agent.

The starting compounds of the formulae II, III and IV are generally used in the ratio of (n+1):n:2. The hydrogen chloride formed can be removed either during or after the reaction, for example by means of an acid acceptor, such as metal carbonates or tertiary amines. The reaction temperatures are in general between 50° and 200° C. The reaction can be performed in the presence of a solvent, preferably water. Also suitable are inert organic solvents, such as ethers, esters, sulfones, hydrocarbons and halogenated hydrocarbons. The desired dicarboxylic acids crystallise out from the reaction mixture, or it can be precipitated out by the addition of solvents, and subsequently purified by recrystallisation.

A preferred embodiment of the process comprises firstly reacting aminodichlorotriazine of the formula II with an aminocarboxylic acid, or with an ester derivative thereof, of the formula IV, in the ratio of 1:1 to give a carboxylic acid of the formula V

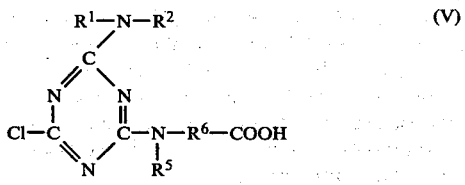

or an ester derivative thereof, and subsequently reacting an aminodichlorotriazine of the formula II with a diamine of the formula III and a carboxylic acid of the formula V, or an ester derivative thereof, in the ratio of (n−1):n:2. Relatively homogeneous products are obtained using this embodiment.

The starting compounds containing triazine rings are produced by processes identical or analogous to those described in Thurston et al., J. Amer. Chem. Soc. 73, p. 2981 ff. (1951), involving direct or stepwise reactions. Under analogous reaction conditions are obtained also the dicarboxylic acids according to the invention. The aminocarboxylic acids and diamines are known compounds.

The dicarboxylic acids according to the invention, and the halides and esters thereof, are colourless to yellowish crystalline substances having melting points or melting ranges between about 100° and 350° C., which are soluble in organic solvents. They are excellently suitable for producing polyesters which have high glass transition temperatures and which have good processing characteristics.

The present invention relates therefore also to linear thermoplastic polyesters formed from one or more dicarboxylic acids and one or more diols, which polyesters contain radicals of dicarboxylic acids of the formula I. The said polyesters can also be homopolyesters which contain only dicarboxylic acid esters of the formula I and radicals of one or more diols, or polyesters which additionally contain radicals of at least one further dicarboxylic acid.

The polyesters can be synthesised from aliphatic, cycloaliphatic and/or aromatic dicarboxylic acids, hydroxycarboxylic acids and diols, the particular composition being governed by economic factors and factors concerning application techniques.

The aliphatic dicarboxylic acids can contain 2–40, preferably 2–36, particularly 6–36, C atoms, the cycloaliphatic dicarboxylic acids 6–10 C atoms, the aromatic dicarboxylic acids 8–14 C atoms, the aliphatic hydroxycarboxylic acids 2–12 C atoms and the aromatic, such as cycloaliphatic, hydroxycarboxylic acids 7–14 C atoms.

The aliphatic diols can contain 2–12, particularly 2–6, C atoms, the cycloaliphatic diols 5–8 C atoms, and the aromatic diols 6–16 C atoms.

The diols designated as aromatic diols are those in which two hydroxyl groups are bound to hydrocarbon radicals of aromatic character.

It is moreover possible for the polyesters to be branched with a small amount, for example 0.1 to 3 mol %, of monomers which are more than bifunctional (for example pentaerythritol or trimellitic acid).

Suitable dicarboxylic acids are straight-chain and branched-chain aliphatic dicarboxylic acids, aromatic dicarboxylic acids and cycloaliphatic dicarboxylic acids.

Aliphatic dicarboxylic acids which are suitable are those having 2–40 C atoms, for example oxalic acid, malonic acid, dimethylmalonic acid, succinic acid, octadecylsuccinic acid, pimelic acid, adipic acid, trimethyladipic acid, sebacic acid, azelaic acid and dimeric acid (dimerisation products of unsaturated aliphatic carboxylic acids such as oleic acid) and alkylated malonic and succinic acids such as octadecylsuccinic acid.

Suitable cycloaliphatic dicarboxylic acids are: 1,3-cyclobutanedicarboxylic acid, 1,3-cyclopentanedicarboxylic acid, 1,3- and 1,4-cyclohexanedicarboxylic acid, 1,3- and 1,4-dicarboxylmethylcyclohexane and 4,4'-dicyclohexyldicarboxylic acid.

And suitable aromatic dicarboxylic acids are: in particular terephthalic acid, isophthalic acid or o-phthalic acid, and also 1,3-, 1,4-, 2,6- or 2,7-naphthalenedicarboxylic acid, 4,4'-diphenyldicarboxylic acid, 4,4'-diphenylsulfonedicarboxylic acid, 1,1,3-trimethyl-5-carboxyl-3-(p-carboxyphenyl)-indane, 4,4'-diphenyl ether dicarboxylic acid and bis-p-(carboxyphenyl)-methane.

The aromatic dicarboxylic acids are preferred, and among them in particular terephthalic acid, isophthalic acid and orthophthalic acid, also 1,4-cyclohexanedicarboxylic acid and aliphatic dicarboxylic acids having 2 to 36 C atoms, preferably 6–36 C atoms.

Further suitable dicarboxylic acids are those which contain —CO-NH— groups: they are described in the German Offenlegungsschrift No. 2,414,349. Also suitable are dicarboxylic acids containing N-heterocyclic rings, for example those derived from carboxylalkylated, carboxylphenylated or carboxylbenzylated mono- or methylenebishydantoins, optionally halogenated benzimidazolones or parabanic acid. The carboxylalkyl group can contain 3 to 20 C atoms.

Suitable aliphatic diols are the straight-chain and branched-chain aliphatic glycols, particularly those having 2- to 12, especially 2 to 6, carbon atoms in the molecule, for example ethylene glycol, 1,2- or 1,3-propylene glycol, 1,2-, 1,3-, 2,3- or 1,4-butanediol, pentyl glycol, neopentyl glycol, 1,6-hexanediol or 1,12-dodecanediol. A suitable cycloaliphatic diol is for example 1,4-dihydroxycyclohexane. Further suitable aliphatic diols are for example: 1,4-dihydroxymethylcyclohexane, aromatic-aliphatic diols such as p-xylylene glycol or 2,5-dichloro-p-xylylene glycol, and also polyoxaalkylene glycol such as diethylene glycol, triethylene glycol or polyethylene glycol. The alkylene diols are preferred straight-chain and contain in particular 2 to 4 carbon atoms.

Preferred diols are the alkylene diols, 1,4-dihydroxycyclohexane and 1,4-dihydroxymethylcyclohexane and N,N-heterocyclic diols. Ethylene glycol and 1,4-butanediol are especially preferred.

Further suitable diols are the β-hydroxyalkylated, particularly β-hydroxyethylated, bisphenols, such as 2,2-bis-[4'-(β-hydroethoxy)-phenyl]-propane. Further bisphenols are mentioned later in the text.

A further group of aliphatic diols are those N,N-heterocyclic diols of the general formula

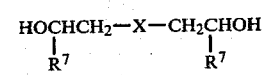

in which
R$^7$ is methyl but preferably a hydrogen atom, and
X is a radical of the formulae

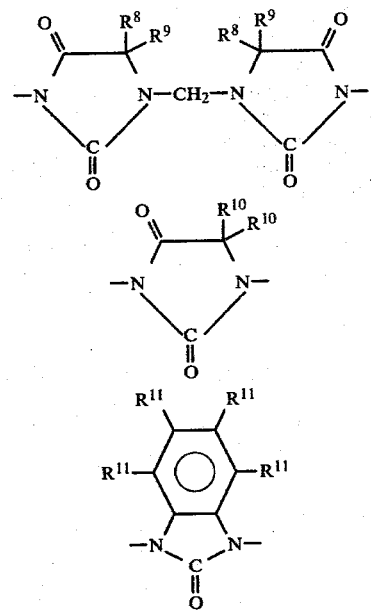

wherein R$^8$, R$^9$ and R$^{10}$ independently of one another are alkyl having 1 to 4 C atoms, or together are tetra- or pentamethylene, and the R$^{11}$ s independently of one another are each a hydrogen, chlorine or bromine atom.

These diols are known are are described, for example, in the German Offenlegungsschriften Nos. 1,812,003, 2,342,432, 2,342,372 and 2,453,326. Examples are: N,N'-bis-(β-hydroxyethyl-5,5-dimethyl)-hydantoin, N,N'-bis-(β-hydroxypropyl-5,5-dimethyl)-hydantoin, methylene-bis-[N,N'-(β-hydroxyethyl)-5-methyl-5-ethylhydantoin], methylene-bis-[N-(β-hydroxyethyl)-5,5-dimethylhydantoin], N,N'-bis-(β-hydroxyethyl)-benzimidazolone, -(tetrachloro)-benzimidazolone or -(tetrabromo)-benzimidazolone.

Preferably, R$^7$ is a hydrogen atom, R$^8$, R$^9$ and R$^{10}$ are each methyl, and all the R$^{11}$ s are each a hydrogen atom or a chlorine or bromine atom.

Suitable aromatic diols are mononuclear diphenols, but particularly binuclear diphenols which carry a hydroxyl group on each aromatic nucleus. By aromatic are meant here hydrocarbon-aromatic radicals, such as phenylene or naphthylene. Besides for example hydroquinone, there are to be mentioned in particular the bisphenols which can be represented by the following formula

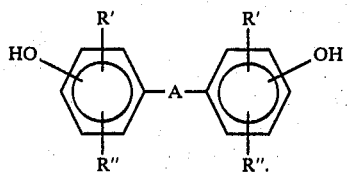

The hydroxyl groups can be in the m-position, particularly however in the p-position. R' and R" in this formula can be alkyl having 1 to 6 C atoms, halogen such as chlorine or bromine, and especially hydrogen atoms. A can be a direct bond, or O, S, $SO_2$, unsubstituted or substituted alkylidene, cycloalkylidene or alkylene.

Examples of unsubstituted or substituted alkylidenes are: ethylidene, 1,1- or 2,2-propylidene, 2,2-butylidene, 1,1-isobutylidene, pentylidene, hexylidene, heptylidene, octylidene, dichloroethylidene or trichloroethylidene. Examples of unsubstituted or substituted alkylene are: methylene, ethylene, phenylmethylene, diphenylmethylene or methylphenylmethylene. Examples of cycloalkylidenes are: cyclopentylidene, cyclohexylidene, cycloheptylidene and cyclooctylidene.

Examples of bisphenols are: bis-(p-hydroxyphenyl)-ether or -thioether, bis-(p-hydroxyphenyl)-sulfone, bis-(p-hydroxyphenyl)-methane, 1,2-bis-(p-hydroxyphenyl)-ethane, 1-phenyl-bis-(p-hydroxyphenyl)-methane, diphenyl-bis-(p-hydroxyphenyl)-methane, 2,2-bis-(4'-hydroxy-3'-methylphenyl)-propane, 1,1- or 2,2-bis-(p-hydroxyphenyl)-butane, 1,1-dichloro or 1,1,1-trichloro-2,2-bis-(p-hydroxyphenyl)-ethane, 1,1-bis-(p-hydroxyphenyl)-cyclopentane and especially 2,2-bis-(p-hydroxyphenyl)-propane (bisphenol-A) and 1,1-bis-(p-hydroxyphenyl)-cyclohexane (bisphenol-C).

Suitable hydroxycarboxylic acids and lactones are, for example: caprolactam, pivalolactone, 4-hydroxycyclohexanecarboxylic acid or 4-hydroxybenzoic acid.

The content of dicarboxylic acids of the formula I in the polyesters according to the invention is in general 0.5–50 mol %, preferably 2–50 mol %, relative to the polyester. If the range of properties of the polyester is to be determined by the dicarboxylic acid of the formula I, this will be present to a predominant extent in the polyester, for example to the extent of 30–50 mol %, preferably 40–50 mol %. A preferred subgroup of these polyesters is that comprising those having a glass transition temperature $(T_g)$ of at least 100° C. A further subgroup is formed by those polyesters having a content of 0.5 to 8 mol %, preferably 1 to 5 mol %, of dicarboxylic acid of the formula I, at least 30 mol % of terephthalic acid and/or isophthalic acid and, as diols, straight-chain alkylenediols having 2 to 4 C atoms, 1,4-cyclohexanediol or 1,4-dihydroxymethylcyclohexane. These polyesters are suitable in particular for producing fibres.

The relative minimum viscosity of the polyesters is 1.2, and preferably the relative viscosity is 1.2 to 4.0, especially 1.2 to 3.0.

The polyesters according to the invention are obtained by known processes in which partially or completely a dicarboxylic acid of the formula I or a polyester-forming derivative thereof, as the dicarboxylic acid constituent, is concomitantly incorporated by condensation, and poly-condensed to the desired viscosity. The process is in general performed at a temperature of 50° to 320° C. under normal pressure, or in vacuo and/or in a stream of inert gas.

The known processes for producing the polyesters are, for example, condensation in solution or azeotropic condensation, interfacial, melt or solid-phase condensation, and also combinations of these methods, depending on which polyester-forming derivatives and reaction catalysts are used. Solid-phase condensation can also be performed in thin layers, optionally with the aid of a solid parting agent, for example micromica, talcum, titanium dioxide or glass balls.

The polyester-forming derivatives of the dicarboxylic acids are principally low-molecular dialkyl esters having 1 to 4 carbon atoms in the molecule, preferably dimethyl esters or diphenyl esters. Also suitable are the acid dihalides, particularly the acid dichlorides and the mixed anhydrides from the dicarboxylic acids and low-molecular aliphatic monocarboxylic acids.

In one embodiment, the polyesters according to the invention can be produced by esterifying or transesterifying the dicarboxylic acids, or low-molecular dialkyl esters thereof, with diols in an inert atmosphere, for example in a nitrogen atmosphere, at 150°–250° C., in the presence of catalysts, with the simultaneous removal of the water or alkanol formed; and subsequently performing the polycondensation at 200° to 320° C. under reduced pressure, in the presence of specific catalysts, until the polycondensates have the desired viscosity. After removal from the reaction vessel and cooling, the polyester melt obtained is granulated or chipped in the customary manner.

The molar ratio of acid component and diol component is in general 1:1; if one of the two components is volatile under the polycondensation conditions, it can also be used in excess.

As esterification catalysts there can be used in a known manner: amines, inorganic or organic acids, for example hydrochloric acid or p-toluenesulfonic acid, or alternatively metals or metal compounds, which are also suitable as transesterification catalysts.

Since some catalysts preferentially accelerate the transesterification and others the polycondensation, it is advantageous to use a combination of several catalysts. Suitable transesterification catalysts are, for example, the oxides, salts or organic compounds of the metals calcium, magnesium, zinc, cadmium, manganese, titanium and cobalt. Also the metals as such can be used used as catalysts. The polycondensation is catalysed for example by metals such as lead, titanium, germanium and, in particular antimony or tin, or compounds thereof. These catalysts can be added together or separately to the reaction mixture. The catalysts are used in amounts of about 0.001 to 1.0 percent by weight, relative to the acid component.

In producing the polyesters according to the invention, the catalysts particularly advantageously employed are those which accelerate both transesterification and polycondensation. Suitable catalysts of this type are especially mixtures of various metals or metal compounds, and also corresponding metal alloys.

A further embodiment for producing the novel polyesters comprises polycondensing dicarboxylic acid dihalides, preferably the acid dichlorides, with diols or diamines, in the presence of a basic catalyst, in the temperature range of 0°–100° C., with the splitting-off of hydrogen halide. The basic catalysts used are preferably amines or quaternary ammonium salts. The proportion of basic catalyst can be 0.1 to 100 mol %, relative to the acid halide. This process can be performed either without solvent or in the presence of a solvent.

Polycondensation can also be performed by firstly condensing the starting compounds in the melt to obtain a certain viscosity; granulating the precondensate thus produced, for example by means of an underwater granulator; drying the granulate, then subjecting it to a solid-phase condensation, with vacuum and with temperatures below the melting point of the granulate being used. Higher viscosities can be obtained in this manner.

During processing of the polyester melt, or even before the polycondensation reaction, there can be added to the reaction mixture inert additives of all types, for example fillers or reinforcing fillers, such as talcum, kaolin, metal powders, wollastonite, glass balls and particularly glass fibres, inorganic or organic pigments, optical brighteners, delustering agents, internal lubricants, agents promoting crystallisation, antioxidants, stabilisers such as phenyl phosphites and phenyl phosphates, and flameproofing agents, for example halogen-containing organic compounds, together with synergistically active compounds, such as antimony trioxide. If the polycondensation reaction is performed discontinuously, the inert additives can be added during the final condensation stages, for example during solid-phase condensation or at the end of the melt condensation stage.

The polyesters according to the invention can be partially crystalline or can be amorphous, depending on which diols and which dicarboxylic acids are used as starting components, and in which quantity ratios these are employed. They are colourless to yellow in shade, and constitute thermoplastic materials (engineering plastics) from which can be produced by the customary moulding processes, such as casting, injection moulding and extruding, moulded articles having valuable properties. Examples of such moulded articles are technical apparatus parts, apparatus housings, domestic appliances, sports equipment, electric insulation, automobile components, switch gear, sheets, films, and semifinished products which can be shaped by machining. Also possible is the application for coating articles by known powder-coating processes or from solutions, and also the application for the production of fibres. A special field of application is that covering shaped articles for the electrical industry, since the polyesters have surprisingly good electrical properties.

The polyesters according to the invention can be easily produced since the dicarboxylic acids of the formula I and the polymer-forming derivatives react well and are stable under heat. The polyesters are colourless or are only slightly discoloured, even after being processed into shaped articles. The mechanical properties too are excellent, particularly the toughness properties, which was not to be expected on the basis of the high proportion of polar bonds. The polyesters according to the invention have high glass transition temperatures but relatively low softening ranges, a factor which ensures good processing characteristics.

The polyesters produced according to the following Examples are further described by the following characteristic data. The polyesters are characterised by those morphological changes which are measured by means of differential thermoanalysis on a specimen tempered for 3 minutes at 30° C. above the melting point or softening point and then rapidly chilled. The chilled specimen is heated at a heating rate of 16° C./minute by means of the differential scanning calorimeter "DSC-2B" (Perkin-Elmer). The thermogram of the specimen shows the glass transition temperature ($T_g$), the crystallisation temperature ($T_c$), the crystallite melt temperature ($T_m$) and the decomposition temperature ($T_d$).

The point of inflection where there occurs a sudden increase in the specific heat in the thermogram is given as the glass transition temperature; the tip of the exothermal peak as the crystallisation temperature; the tip of the endothermic peak as the melting temperature; and the point at which the sudden exo- and endothermic fluctuations of the specific heat commence is given as the decomposition temperature ($T_d$). The relative viscosity of the polycondensates of the Examples is determined on solutions of 1 g of polyester in 100 ml of a mixture consisting of equal parts of phenol and symmetrical tetrachloroethane, at 30° C. The softening temperature ($T_s$) is determined on a hot-stage microscope according to Kofler with a heating-up rate of 15° C./minute, by which system a cross is formed from 2 filaments, and the softening temperature is defined as being that temperature at which the sharp angles of the cross disappear.

The following Examples serve to further illustrate the invention.

EXAMPLE 1

Production of 4,4'-bis-[[2-diphenylamino-4-[(4-ethoxycarbonylphenyl)-amino]-s-triazin-6-yl]-amino]-diphenylmethane (I)

44.5 g (0.1 mol) of 2-diphenylamino-4-(4-ethoxycarbonylphenyl)-amino-6-chloro-s-triazine and 9.9 g (0.05 mol) of 4,4'-diaminodiphenylmethane are refluxed in 500 ml of chlorobenzene for 15 hours. After the addition of 4 g of sodium carbonate (dissolved in 50 ml of $H_2O$), the reaction mixture is refluxed for a further 2 hours. On cooling, the reaction product which has precipitated is filtered off with suction, and recrystallised from o-dichlorobenzene to yield 33 g (66% of theory) of colourless crystalline I having a melting point of 299°–304° C. The NMR spectrum is in agreement with the structure assumed for I.

EXAMPLE 2

Production of the dicarboxylic acid ester II (n∼2)

19 g (0.06 mol) of diphenylamino-4,6-dichloro-s-triazine, 7.9 g (0.04 mol) of 4,4'-diaminodiphenylmethane and 6.6 g (0.04 mol) of 4-aminobenzoic acid ethyl ester in 100 g of phenyl are stirred for 5 hours at 120° C. under nitrogen. The reaction mixture is cooled, and 100 ml of dioxane and 10 ml of pyridine are added. The formed solution is poured with vigorous stirring into 500 ml of methanol. The product which has precipitated is filtered off with suction and washed thoroughly with methanol. The yield obtained after drying is 20 g of II (69% of theory) as a yellowish crystalline product having a melting range of 198°–217° C.

EXAMPLE 3

Production of the dicarboxylic acid ester III (n∼3)

12.7 g (0.04 mol) of 2-diphenylamino-4,6-dichloro-s-triazine, 5.6 g (0.03 mol) of 4,4'-diaminodiphenylmethane and 3.3 g (0.02 mol) of 4-aminobenzoic acid ethyl ester are reacted and further processed as in Example 2. The yield obtained is 11 g of III (58% of theory) as a yellowish crystalline product having a melting range of 216°–230° C.

EXAMPLE 4

Production of the dicarboxylic acid ester (IV) (n~5)

25.4 g (0.08 mol) of 2-diphenylamino-4,6-dichloro-s-triazine and 19.8 g (0.1 mol) of 4,4'-diaminodiphenylmethane in 200 g of phenol are stirred for 24 hours at 80° C. under nitrogen. After the addition of 17.8 g (0.04 mol) of 2-diphenylamino-4-(4-ethoxycarbonylphenyl)-amino-6-chloro-s-triazine, the reaction mixture is held for a further 24 hours at 80° C. Further processing is performed as in Example 3 to obtain 34 g of IV as a yellowish crystalline product having a melting range of 212°–228° C.

EXAMPLE 5

Production of the dicarboxylic acid ester V (n~10)

28.5 g (0.09 mol) of 2-diphenylamino-4,6-dichloro-s-triazine is reacted with 19.8 g (0.1 mol) of 4,4'-diaminodiphenylmethane and 8.9 g of 2-diphenylamino-4-(4-ethoxycarbonylphenyl)-amino-6-chloro-s-triazine in the manner described in Example 4. The yield obtained is 35 g of V (70% of theory) as a yellowish crystalline product having a melting range of 220°–280° C.

EXAMPLE 6

Production of 4,4'-bis-[[2-diphenylamino-4-[(5-methoxycarbonylpentyl)-amino)-s-triazin-6-yl]-amino]-diphenylmethane (VI)

173 g (0.42 mol) of 2-diphenylamino-4-(5-carboxypentyl)-amino-6-chloro-s-triazine and 39.6 g (0.2 mol) of 4,4'-diaminodiphenylmethane are refluxed in chlorobenzene for 4 hours. The reaction mixture is cooled, and the crystalline product is filtered off with suction, dried, and subsequently refluxed in 1.5 liters of methanol, while gaseous HCl is being passed through, for 6 hours. On cooling, the product which has crystallised out is filtered off with suction, dissolved in methylene chloride and washed neutral with sodium bicarbonate solution and water. Methanol is added to precipitate a crystalline product, which is subsequently recrystallised from chlorobenzene to yield 102 g of VI (55% of theory) in the form of a colourless crystalline product having a melting point of 233°–235° C.

The NMR spectrum corresponds with the structure assumed for VI.

EXAMPLE 7

Production of 4,4'-bis-[[2-diphenylamino-4-[(methoxycarbonylmethyl)-amino]-s-triazin-6-yl]-amino]-diphenylmethane (VII)

35.6 g (0.1 mol) of 2-diphenylamino-4-carboxymethylamino-6-chloro-s-triazine and 9.9 g (0.05 mol) of 4,4'-diaminodiphenylmethane are reacted by the process described in Example 6, esterified and purified. The yield obtained is 21 g of VII (50% of theory) in the form of a colourless crystalline product having a melting point of 231°–232° C. The NMR spectrum corresponds with the structure assumed for VII.

EXAMPLE 8

Production of 4,4'-bis-[[2-diphenylamino-4-[(4-ethoxycarbonylphenyl)-amino]-s-triazin-6-yl]-amino]-diphenyl ether (VIII)

In a manner analogous to that in Example 1, 17.8 g (0.04 mol) of 2-diphenylamino-4-(4-ethoxycarbonylphenyl)-amino-6-chloro-s-triazine is reacted with 4 g (0.02 mol) of 4,4'-diaminodiphenyl ether to yield 8 g of VIII (40% of theory) in the form of a colourless crystalline product having a melting point of 299°–304° C.

EXAMPLE 9

Production of 1,4-bis-[4-[2-diphenylamino-[(4-ethoxycarbonylphenyl)-amino]-s-triazin-6-yl]-aminophenoxy]-benzene (IX)

In a manner analogous to that in Example 1, 22.3 g (0.05 mol) of 2-diphenylamino-4-(4-ethoxycarbonylphenyl)-amino-6-chloro-s-triazine is reacted with 7.3 g (0.025 mol) of 1,4-bis-(4-aminophenoxy)-benzene to yield 19 g of IX (76% of theory) in the form of a colourless crystalline product having a melting point of 306°–315° C.

EXAMPLE 10

Production of 1,4-bis-[4-[2-diphenylamino-4-[(4-ethoxycarbonylphenyl)-amino]-s-triazin-6-yl]-aminomethyl]-2,3,5,6-tetrachlorobenzene (X)

In a manner analogous to that in Example 1, 22.3 g (0.05 mol) of 2-diphenylamino-4-(4-ethoxycarbonylphenyl)-amino-6-chloro-s-triazine is reacted with 6.84 g (0.025 mol) of 2,3,5,6-tetrachloro-p-xylylenediamine to yield 11.6 g of X (43% of theory) in the form of a colourless crystalline product having a melting point of 254°–255° C.

EXAMPLE 11:

Production of 4,4'-bis-[[2-diethylamino-4-[(4-ethoxycarbonylphenyl)-amino]-s-triazin-6-yl]-amino]-diphenylmethane (XI)

In a manner analogous to that described in Example 1, 20.9 g (0.06 mol) of 2-diethylamino-4-(4-ethoxycarbonylphenyl)-amino-6-chloro-s-triazine is reacted with 5.9 g (0.03 mol) of 4,4'-diaminodiphenylmethane to yield 21 g (85% of theory) of XI in the form of a colourless crystalline product having a melting point of 215°–218° C.

EXAMPLE 12

Production of the dicarboxylic acid ester XII (n~5)

In a manner analogous to that described in Example 5, 9.94 g (0.045 mol) of 2-diethylamino-4,6-dichloro-s-triazine is reacted with 9.9 g (0.05 mol) of 4,4'-diaminodiphenylmethane and 3.5 g (0.01 mol) of 2-diethylamino-4-(4-ethoxycarbonylphenyl)-amino-6-chloro-s-triazine to yield 16.5 g (84% of theory) of XII in the form of a yellowish crystalline product having a melting range of 195°–250° C.

In the table given below are listed the dicarboxylic acids of the Examples 1–12 according to the formula I.

| Example No. | Compound No. | $R_1$ and $R_2$ | $R_3$ | $R_4$ | $R_5$ | $R_6$ | n |
|---|---|---|---|---|---|---|---|
| 1 | I | phenyl | H | | H |  | 1 |
| 2 | II | " | " | 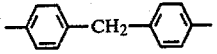 | " | " | ~2 |
| 3 | III | " | " | | " | " | ~3 |
| 4 | IV | " | " | | " | " | ~5 |
| 5 | V | " | " | | " | " | ~10 |
| 6 | VI | " | " | | " | $-(CH_2)_5-$ | 1 |
| 7 | VII | " | " | | " | $-CH_2-$ | 1 |
| 8 | VIII | " | " | 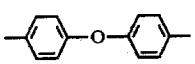 | " | | 1 |
| 9 | IX | " | " |  | " | " | 1 |
| 10 | X | " | " | 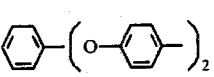 | " | " | 1 |
| 11 | XI | ethyl | " | 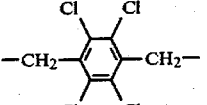 | " | " | 1 |
| 12 | XII | " | " | | " | " | 10 |

EXAMPLE 13

In a 200 ml glass reactor provided with stirrer, nitrogen inlet and condenser, 10.17 g of dicarboxylic acid I, 2.36 g of hexanediol-1,6 and 0.01% of titanium tetraisopropylate are mixed together and melted. In the course of one hour, the reaction mixture is heated under nitrogen, in an oil bath, to 200° C. and is then heated within a further hour to 240° C., in the course of which the major part of the theoretical amount of ethanol distills off. The temperature of the oil bath is subsequently adjusted to 280° C., and simultaneously a vacuum of 0.1 Torr is carefully applied. After this vacuum has been established, condensation is for 10 minutes with stirring; nitrogen is then introduced and the polyester is removed from the reactor. The relative viscosity of this copolyester is 1.41 and the glass transition temperature ($T_g$) is 202° C. The pulverised melt condensate is spread out in a thin layer on the bottom of a Teflon dish, and is further condensed for 30 hours at 220° C. in vacuo (0.5 Torr). The relative viscosity is then 2.50.

EXAMPLES 14–25

The polyesters listed in the following table were produced, analogously to Example 13, in a known manner by transesterification and subsequent polycondensation of the starting materials given in the Table. With the use of butanediol or hexanediol, there is employed as catalyst 0.01% by weight of titanium in the form of tetraisopropylate (relative to the acid component), and in the case of polyesters with ethylene glycol there is used 0.1% by weight of calcium in the form glycolate and 0.5% by weight of germanium in the form of butylate. The polycondensation temperature in the case of the hexanediol polyesters is 280° C., and in the case of the polyesters with ethylene glycol and butanediol-1,4 it is 270° C.

| Ex. No. | Starting materials dicarboxylic acid diol | Mol ratio used | $n_{rel}$ | $T_g$ (°C.) | $T_s$ (°C.) |
|---|---|---|---|---|---|
| 14 | II + hexanediol-1,6 | 1:4 | 1.29 | 209 | 215 |
| 15 | III + hexanediol-1,6 | 1:4 | 1.33 | 219 | 250 |
| 16 | VI + ethylene glycol | 1:4 | 1.91 | 128 | 170 |
| 17 | VI + butanediol-1,4 | 1:4 | 1.76 | 119 | 150 |
| 18 | VII + ethylene glycol | 1:4 | 1.26 | 181 | 210 |
| 19 | VII + butanediol-1,4 | | 1.36 | 181 | 195 |
| 20 | VIII + hexanediol-1,6 | 1:4 | 1.47 | 195 | 235 |
| 21 | IX + hexanediol-1,6 | 1:4 | 1.42 | 183 | 235 |
| 22 | X + hexanediol-1,6 | 1:4 | 1.29 | 201 | 250 |
| 23 | XI + ethylene glycol | 1:4 | 1.45 | 171 | 215 |
| 24 | XII + hexanediol-1,6 | 1:4 | 1.49 | 174 | 200 |
| 25 | I + A + hexanediol-1,6 | 1:0.1:3.9 | 1.47 | 198 | 230 |

A = methylene-bis-[N-(2-hydroxyethyl)-5,5-dimethyl-hydantoin]

EXAMPLE 26 AND COMPARATIVE EXAMPLE

Using a procedure analogous to that described in Example 13, there is produced in each case about 200 g of the following polyesters and, after condensation in a thin layer, the polyesters are injection moulded into the form of standard small test bars, on which the following properties are measured:

| | Example 26 | Comparative example |
|---|---|---|
| composition | I + hexanediol-1,6 (1:1) | B + hexanediol-1,6 (1:1) |
| $n_{rel}$ | not measurable | 2.14 |
| dimensional stability under heat (°C.) ISO/R 75 PS | 170 | 145 |
| LOI (ASTM D 2863) | 24.9 | 23.7 |

B: 2-diphenylamino-4,6-bis-(4-carbethoxyanilino)-s-triazine

We claim:
1. A compound of the formula

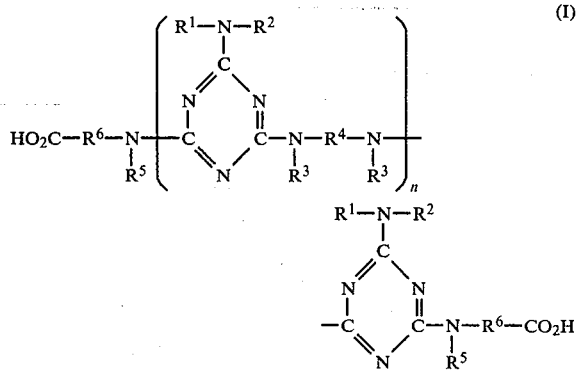

in which n has a value from 1 to 100,

R$^1$, R$^2$, R$^3$ and R$^5$ independently of one another are each a hydrogen atom, a straight- or branched-chain alkyl of 1 to 22 C atoms, cycloalkyl of 5 to 7 C atoms, cyclohexylmethyl, aryl of 6 to 10 C atoms, benzyl, or said cycloalkyl, said cyclohexylmethyl, said aryl or said benzyl substituted with alkyl of 1 to 4 C atoms, or R$^1$ and R$^2$ together are alkylene of 3 to 7 C atoms, 3-oxapentylene or 3-thiapentylene, R$^4$ is a straight- or branched-chain alkylene of 2 to 18 C atoms, cycloalkylene of 5 to 7 C atoms, arylene of 6 to 10 C atoms, cycloalkylenealkylene or cycloalkylenebisalkylene with 1 to 4 C atoms in the alkylene group, arylenealkylene or arylenebisalkylene with 1 to 4 C atoms in the alkylene group; or said cycloalkylene, said cycloalkylenealkylene or said cycloalkylenebisalkylene substituted with alkyl of 1 to 4 C atoms, or said arylene, said arylenealkylene or said arylenebisalkylene substituted by alkyl of 1 to 6 C atoms or by halogen, or R$^4$ is phenylene-X-phenylene where X is a direct bond, O, S, SO$_2$, alkylene of 1 to 3 C atoms, alkylidene of 2 to 12 C atoms, cycloalkylidene of 5 to 6 C atoms, benzylidene, bisphenylmethylidene, 1,1,1-trichloroethylidene or -O-p-phenylene-O—, or R$^4$ together with one R$^3$ and the N atom to which they are bound form a ring having 4 to 7 C atoms, or R$^4$, and also both R$^3$s together, are alkylene groups having 1 to 5 atoms, and forming together with the two N atoms a 5- to 7-membered ring, and R$^6$ is a straight- or branched-chain alkylene or alkylidene of 1 to 12 C atoms, o-phenylene, m-phenylene, p-phenylene, p-benzylene or p-cyclohexylene or the corresponding acid halides, or the corresponding esters where the ester moiety is alkyl or hydroxyalkyl of 1 to 12 C atoms, cycloalkyl or hydroxycycloalkyl of 5 to 6 ring carbon atoms or aryl of 6 to 10 C atoms.

2. A compound according to claim 1 wherein R$^1$ and R$^2$ are both phenyl or ethyl, R$^3$ is hydrogen, R$^4$ is p-phenylene-X-p-phenylene where X is methylene, O, or O-p-phenylene-O; or R$^4$ is 2,3,5,6-tetrachloro-p-xylylene, R$^5$ is hydrogen, R$^6$ is methylene, pentamethylene or p-phenylene, and n is 1 to about 10.

3. A dicarboxylic acid according to claim 1, which as halide is acid dichloride.

4. A dicarboxylic acid ester according to claim 1 wherein aryl is phenyl.

5. A dicarboxylic acid according to claim 1, wherein n has a value from 1 to 50.

6. A dicarboxylic acid according to claim 5 wherein n has a value from 1 to 10.

7. A dicarboxylic acid according to claim 1, wherein alkylene together contain 4 to 7 C atoms.

8. A dicarboxylic acid according to claim 1, wherein R$^4$ contains 2 to 15 C atoms.

9. A dicarboxylic acid according to claim 1, wherein R$^6$ contains 1 to 7 C atoms.

10. A dicarboxylic acid according to claim 1, wherein together are butylene, pentylene, 3-oxapentylene or 3-thiapentylene.

11. A dicarboxylic acid according to claim 1, wherein R$^3$ and R$^5$ are each a hydrogen atom.

12. A dicarboxylic acid according to claim 1 wherein X is alkylidene having 2 to 6 C atoms.

13. A dicarboxylic acid according to claim 1 wherein R$^6$ is alkylene having 1 to 6 C atoms.

14. A dicarboxylic acid according to claim 1, wherein R$^1$ and R$^2$ are each alkyl having 1 to 4 C atoms or phenyl, and R$^1$ and R$^2$ together are pentylene, R$^3$ and R$^5$ are each a hydrogen atom, R$^4$ is alkylene having 2 to 6 C atoms, or cycloalkylene which has 5 or 6 ring carbon atoms and which can be substituted by alkyl having 1–4 C atoms, or R$^4$ is phenylene, phenylenebisalkylene, or a radical of the formula

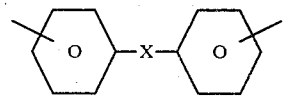

in which X is a direct bond, O, S, SO$_2$ or CH$_2$ or alkylidene having 1 to 6 C atoms.

15. A dicarboxylic acid according to claim 14 wherein R$^4$ is xylylene.

* * * * *